Figure 1:
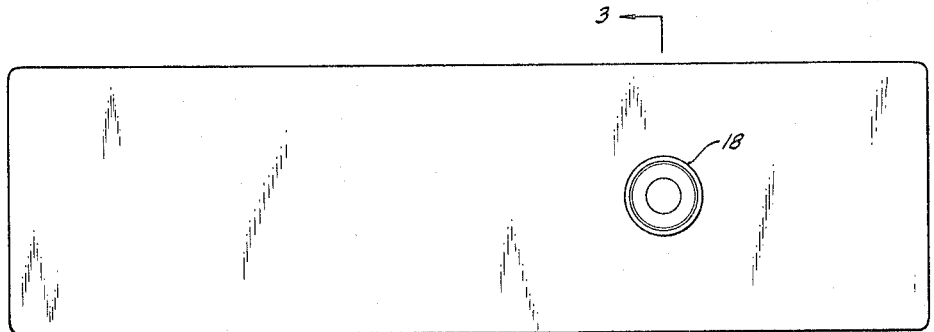

Dec. 6, 1966 G. W. GILLEMOT 3,290,194
PROCESS AND APPARATUS FOR INJECTING
FLUIDS INTO A SHEATHED CABLE
Filed June 28, 1965 3 Sheets-Sheet 1

INVENTOR
GEORGE W. GILLEMOT
BY
*Jack M. Miller*
ATTORNEY

Dec. 6, 1966  G. W. GILLEMOT  3,290,194
PROCESS AND APPARATUS FOR INJECTING
FLUIDS INTO A SHEATHED CABLE
Filed June 28, 1965  3 Sheets-Sheet 2

INVENTOR
GEORGE W. GILLEMOT
BY Jack M. Miller
ATTORNEY

Dec. 6, 1966  G. W. GILLEMOT  3,290,194
PROCESS AND APPARATUS FOR INJECTING
FLUIDS INTO A SHEATHED CABLE
Filed June 28, 1965  3 Sheets-Sheet 3

INVENTOR
GEORGE W. GILLEMOT
BY Jack M. Miller
ATTORNEY

United States Patent Office
3,290,194
Patented Dec. 6, 1966

3,290,194
PROCESS AND APPARATUS FOR INJECTING
FLUIDS INTO A SHEATHED CABLE
George W. Gillemot, Venice, Calif., assignor to GFC
Engineering and Sales Corporation, Los Angeles, Calif.,
a corporation of California
Filed June 28, 1965, Ser. No. 467,541
8 Claims. (Cl. 156—48)

This invention relates to a device and method for injecting fluids into the interior of a sheathed cable.

Many sheathed cables are composed of an interior portion containing a plurality of filaments and an exterior fluid-tight sheath. Often the interiors of these sheathed cables are either pressurized or evacuated for various purposes. The maintenance of a fluid-tight environment throughout the length of the cable requires that occasionally gas-tight seals or pressure dams be inserted in the cable at various points along its length. Further, it is often necessary to provide some means for applying fluid pressure to the interior of the cable at some specific point along its length.

Previously, considerable difficulty had been experienced in preparing effective pressure dams in sheathed cables, particularly where the exterior sheath of the cable contained more than one layer.

According to the present invention these and other difficulties of prior procedures and devices have been overcome.

Broadly, the present invention comprises a device for injecting fluids into the interior of a sheathed cable, said cable being provided in the interior thereof with a plurality of filaments. This plurality of filaments is contained within an exterior fluid-tight sheath.

More particularly, this device for injecting fluids into the interior of a sheathed cable comprises an elongated injection nozzle adapted to extend from the exterior of said cable at least part way into the plurality of filaments contained in the interior or core of the cable. This injection nozzle serves to inject fluid into the interior of the cable through a plurality of openings provided in the walls of the nozzle.

The injection nozzle is so positioned within the interior of the cable that substantially every cross-sectional opening in the cable in the area of the nozzle receives fluid from said nozzle.

A flexible sheet-shaped flap is provided in operative association with said injection nozzle so as to prevent the leakage of fluids from the interior to the exterior of said cable and to secure said nozzle in position in the interior of said cable. The longitudinal axis of the elongated injection nozzle is generally perpendicular to the plane of the sheet-shaped flap and extends through said flap. The side of the flap which is adjacent to the injection nozzle is adapted to be secured to the exterior surface of a cable so as to provide a fluid-tight seal around said cable.

The flap is generally rectangular in shape adapted so that it can be wrapped lengthwise around a cable so as to form a cylinder around the exterior of a round cable. Since the flap is flexible it is also adapted to be wrapped around any other shape of cable, for example, a cable having a square cross-section.

Figure 2:
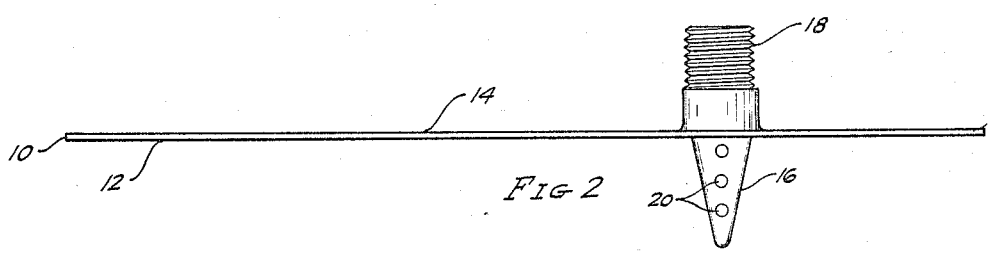
Figure 6:
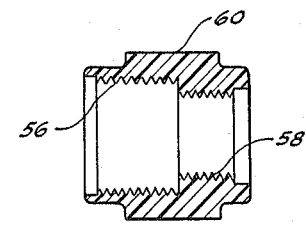
Figure 3:
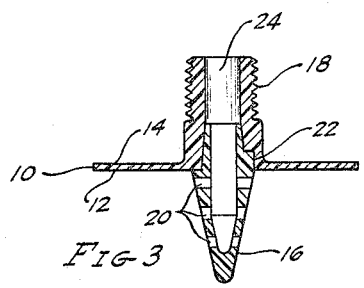
Figure 5:
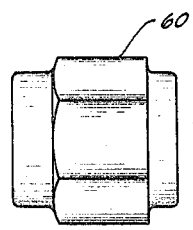
Figure 4:
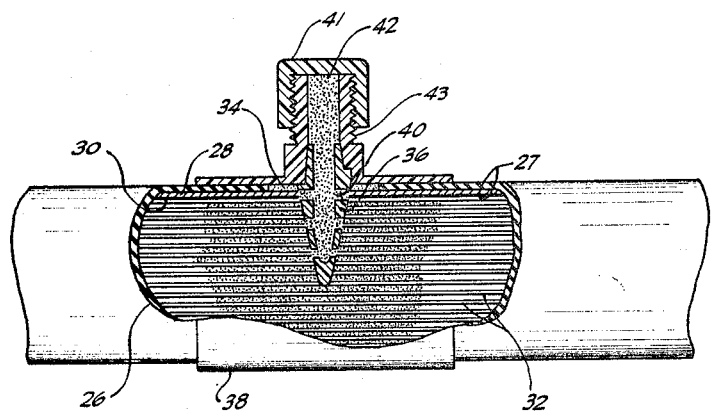
Figure 15:
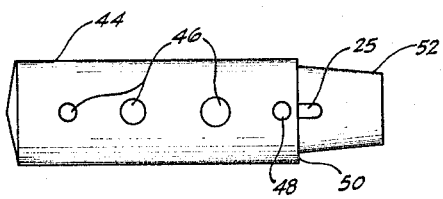
Figure 16:
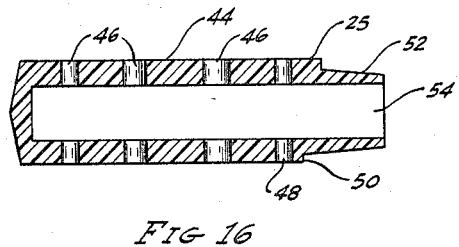
Figure 14:
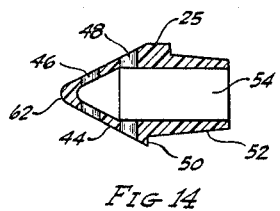
Figure 8:
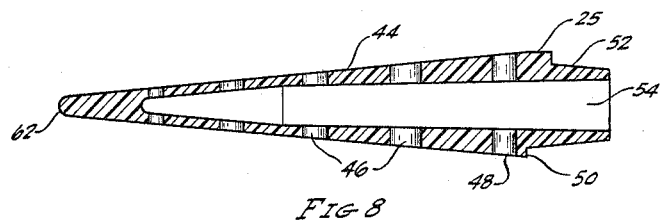
Figure 13:
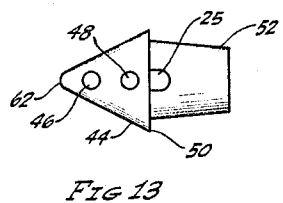
Figure 7:
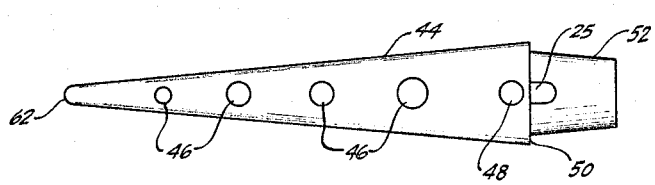
Figure 12:
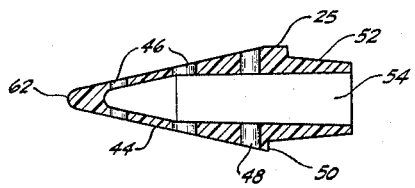
Figure 10:
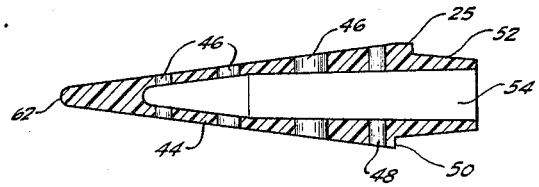
Figure 11:
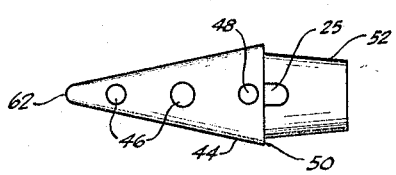
Figure 9:
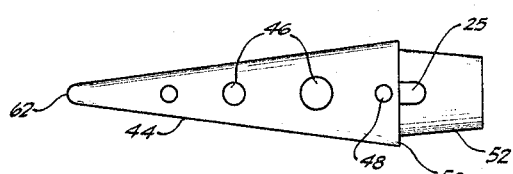

For a more detailed understanding of the invention reference is made to the accompanying drawings in which FIGURE 1 is a plan view of the device of this invention;
FIGURE 2 is a side elevation of the device shown in FIGURE 1;
FIGURE 3 is a cross-sectional view taken on line 3—3 of FIGURE 1;
FIGURE 4 is a cross-sectional view of the device of this invention in use in a sheathed cable;
FIGURE 5 is an elevation of a threaded adapter for use with this invention;
FIGURE 6 is a cross-sectional view of the threaded adapter shown in FIGURE 5;
FIGURE 7 is a side elevation of one form of the elongated injection nozzle of this invention;
FIGURE 8 is a cross-sectional view of the elongated injection nozzle shown in FIGURE 7;
FIGURE 9 is a side elevation of another form of elongated tapered injection nozzle;
FIGURE 10 is a cross-sectional view of the injection nozzle shown in FIGURE 9;
FIGURE 11 is a side elevation of an additional form of the elongated injection nozzle of this invention;
FIGURE 12 is a cross-sectional view of the injection nozzle shown in FIGURE 11;
FIGURE 13 is a side elevation view of an elongated tapered injection nozzle;
FIGURE 14 is a cross-sectional view of the injection nozzle shown in FIGURE 13;
FIGURE 15 is a side elevation view of another form of the elongated injection nozzle of this invention;
FIGURE 16 is a cross-sectional view of the injection nozzle shown in FIGURE 15.

Referring particularly to FIGURES 1, 2 and 3, a device for injection fluids into the interior or core of a sheathed cable is illustrated in which 10 is a flexible sheet-shaped flap having sides 12 and 14. Injection nozzle 16 is affixed to flap 10 by being press-fitted into fitting 18.

Fitting 18 is shown as an integral part of flexible sheet-shaped flap 10. However, it is not necessary to form fitting 18 integrally with flap 10. For example, it is possible to provide fitting 18, nozzle 16 and flap 10 as three separate parts which are formed into a single unit just prior to being used.

In order to facilitate the positioning of openings 20 in a pre-determined alignment with respect to the axis of the cable with which this fluid injection device is to be used, keyway 22 is provided in fitting 18. Keyway 22 aligns key 25, see FIGURE 14, so that accurate alignment of openings 20 is readily obtained.

As illustrated, injection nozzle 16 is press-fitted into fitting 18. Any suitable connecting means can be provided to join fitting 18 and injection nozzle 16, for example, a threaded connection, not shown, can be employed.

Fitting 18 is provided with some suitable connection means, such as the threads illustrated, which will permit its being joined to a suitable fluid supply source. A longitudinal opening 24 extends through fitting 18, flap 10 and into injection nozzle 16. Fluid is communicated through this longitudinal opening 24 into nozzle 16 and out of nozzle 16 through openings 20.

Side 12 of flap 10 is adapted to be secured to the exterior surface of a cable in a fluid-tight relationship.

To accomplish this function, side 12 can be provided with a pressure sensitive adhesive or it can be prepared so as to make it particularly adherent to some cement or gluing agent which is applied thereto at the time flap 10 is wrapped around a cable. Also side 12 may be adapted to fit tightly against the exterior of a cable, held in that relationship by some binding such as tape, clamps and the like. Convenient markings can be provided at predetermined points along the length of flap 10 so that they indicate lengths on flap 10 which correspond to standard cable diameters. These markings permit a workman to accurately trim the length of flap 10 to the most desirable length for use with any standard size cable without the necessity of resorting to time consuming cut and try methods.

Referring specifically to FIGURE 4, this figure illustrates a cutaway view of the device of this invention in operative association with a sheathed cable. The sheathed cable is composed of a fluid-tight sheath 27 which is made up of three layers, an outer rubber-like covering or sheath 26, a metal covering or shield 28 and an inner lining or core binder 30. The interior of said cable contains a plurality of filaments 32. These filaments can be of any construction, for example, hollow fluid carrying conduits, insulated electrical conductors, and the like. Many cables of this type are used in the communications arts, particularly in telephone cable systems in which a positive internal gas pressure is maintained within the sheath to exclude moisture and other foreign matter from contact with the filaments.

In using the device of this invention, at least a portion of the outer covering 26 is removed from the cable. Preferably, a completely circumferential portion of the outer covering 26 is removed so that pocket 34 extends completely around the circumference of the cable. At least a portion of metal 28 and inner lining 30 is removed to permit the entrance of the injection nozzle 36 into the interior of the cable in contact with filaments 32. The inner lining 30 and metal 28 can be removed over the entire circumference of the cable or not as desired.

Flap 38 is wrapped around the cable and secured to a portion of the exterior of the cable in a fluid-tight relationship so that pocket 34 is completely enclosed to prevent the leakage of fluid from the interior of the cable to the exterior. Preferably flap 38 extends completely around the cable so that the opposite ends of the flap abut one another and the flap completely covers pocket 34. However, it is possible to extend flap 38 only partially around the cable so that it only partially covers pocket 34. In this instance some additional sealing device is necessary to seal pocket 34 from the exterior of the cable. Such devices include, for example, the use of friction tape wrapped around the cable covering pocket 34.

Flap 38 serves not only to seal pocket 34 and prevent the leakage of fluid to the exterior of the cable, but it also serves to secure injection nozzle 36 in the interior of the cable. When fluid pressure is applied, nozzle 36 tends to rise out of the cable and is restrained in this tendency by flap 38. In performing this restraining function, flap 38 is preferably wrapped completely around the circumference of the cable with the ends of the flap at least abutting one another since considerably more force is required to dislodge the flap when in this configuration than when it only partially surrounds the circumference of the cable. Cover cap 41 is provided to prevent fluid from leaking back out of opening 42 after the source of fluid, not shown, is disconnected from fitting 43.

Lateral openings 40 are provided in the tapering walls of injection nozzle 36. Fluid is communicated through longitudinal opening 42 to lateral openings 40 and then out of the nozzle into the interior of the cable. At least some of the openings preferably open along the longitudinal axis of the cable since this positioning facilitates the flow and distribution of fluid along and around the filaments, and also facilitates the distribution of the fluid in an inter-laminated manner between outer covering 26, metal 28, and inner-lining 30. However, openings 40 can be aligned in any direction so long as the fluid can spread throughout the void area of the cable.

When the fluid injected into the interior of the cable is a hardenable fluid injected for the purpose of preparing a pressure dam, it is a particularly advantageous feature of this invention that the cross-sectional openings or annuli between the rubber-like covering 26, metal 28 and inner-lining 30 are completely filled with hardenable fluid thus sealing them to prevent pressure leakage between these layers of the fluid-tight sheath.

FIGURE 4 is illustrative of a pressure dam which has been prepared using the device of this invention. Each of the cross-sectional openings in the cable, including those between the layers in sheath 27 as well as those between filaments 32, has been filled with hardenable fluid provided through injection nozzle 36. The injection nozzle extends in a direction perpendicular to the longitudinal axis of the cable substantially into the filaments in the core of the cable and preferably at least one-half way through the bundle of filaments. In the instance where the cable has a round configuration the nozzle preferably extends to a depth of at least one-half the diameter of the cable into the core.

Referring particularly to FIGURES 7 through 16, there are illustrated various configurations of injection nozzles for use in the device of this invention. As illustrated, each of these forms of the injection nozzle has walls 44 containing lateral openings 46 and 48. Lateral openings 48 are generally provided in close proximity to shoulders 50 so they discharge into pocket 34, FIGURE 4. By cooperation between key 25 and keyway 22, FIGURE 3, lateral openings 46 and 48 are conveniently aligned in any desired predetermined relationship with respect to filaments 32, FIGURE 4. Preferably, lateral openings 46 and 48 are so aligned that they are approximately parallel to the longitudinal axis of filaments 32. This facilitates the distribution and flow of fluid along and between these filaments.

Shoulder 50 is adapted to abut side 12 of flap 10, FIGURE 2. The abutment of shoulder 50 against side 10 serves to restrain the injection nozzle in place in the cable when fluid pressure is applied through the nozzle. The stem portion 52 of the nozzle extends through an opening in flap 10 and into cooperative association with fitting 18. A longitudinal opening 54 is provided in the nozzle through which fluid is supplied to lateral openings 46 and 48.

In a preferred form of the apparatus illustrated in the drawings the injection nozzle is separate from the flexible flap 10 and fitting 18 is integral with that flap. This arrangement facilitates the alignment of lateral openings 46 and 48 with the filaments in the cable as discussed above.

It is also an advantage to be able to separate the injection nozzle from the flap 10 and fitting 18 because this permits the use of a single standard combined flap-fitting assembly with a wide variety of shapes and sizes of injection nozzles, such as those illustrated in FIGURES 7 through 16. For example, for a relatively small diameter cable, an injection nozzle having a relatively short penetration length such as that illustrated in FIGURES 13 and 14 would be most suitable. For particularly large diameter cables, that injection nozzle illustrated in FIGURES 7 and 8 would be preferable. Either of these injection nozzles can be used with the same flap and fitting assembly illustrated in FIGURES 1 through 3. It is not, however, necessary to make the injection nozzle separable from the flap and fitting assembly. For example, the injection nozzle can be formed as an integral or detachable part of the flap and a wide variety of detachable fittings can be provided to accommodate various fluid supply systems. This is an alternative to providing some adapter such as that shown in FIGURES 5 and 6 which serves to accommodate fitting 18 to any desired fluid supply system. As shown in FIGURE 6, the threaded portion 56 of adapter 60 is adapted to be screwed onto fitting 18 and threaded portion 58 of adapter 60 is adapted to receive a smaller diameter externally threaded connector.

The tapered configuration of the injection nozzles shown in FIGURES 7 through 14 is particularly advantageous. This configuration permits point 62 to be forced into a bundle of filaments with minimum risk of breaking or otherwise damaging any of the filaments. Generally the nozzle has a conical shape although it may be made in other tapered configurations, for example, as a wedge.

These nozzles do not require that an opening be prepared to receive them in the bundle of filaments. Preferably the injection nozzles are prepared of some non-electrically conductive, non-abrasive material which does not carry any sharp edges. These characteristics reduce to a minimum the possibilities of injuring the filaments in the cable.

Suitable plastic materials from which the device of this invention can be prepared include, for example, liner polyethylene, other polyolefins, nylons, other thermoplastic materials as well as thermosetting materials and the like. Different materials of construction can be used for the flap and the nozzle, if desired. Metals, composition materials, rubbers, and the like, can also be used to form the elements of my apparatus.

The hardenable fluids or cable damming compounds which are injected through the device of this invention when a pressure dam is to be prepared should be sufficiently fluid to permit their injection with a minimum of fluid pressure yet they should have a relatively short jell time so that they will harden rapidly before they flow out of the immediate site of their injection. Suitable hardenable fluids include, for example, polysulfide and polyepoxy resins and the like.

When the device of this invention is to be used to pressurize or evacuate the interior of a cable or to provide a convenient top for taking pressure readings, it is particularly important that a fluid-tight seal be obtained between the flap and the exterior surface of said cable. Various adhesives, tapes, cements, mechanical clamps and the like are suitable for this purpose.

As will be understood by those skilled in the art, what has been described are preferred embodiments of this invention but modifications and alterations therein may be made within the scope and spirit of the appended claims.

I claim:

1. The method of injecting fluid into the interior of a sheathed cable, said cable having in the interior thereof a bundle of filaments, said bundle of filaments being contained within an exterior sheath which method comprises:

forming an opening in said exterior sheath by removing a portion of said exterior sheath from said cable;

inserting an elongated injection nozzle through said opening and at least part way into the interior of said bundle of filaments, said injection nozzle being affixed to a flexible sheet-shaped flap;

wrapping said flap around said cable in operative association with said opening;

securing said flap to the exterior of said sheath to form a substantially fluid-tight seal around said opening; and injecting fluid through said nozzle directly into the interior of said cable, said fluid being injected from said nozzle at a point within the interior of said bundle of filaments.

2. A device for injecting fluids into the interior of a sheathed cable, said cable having in the interior thereof a bundle of filaments, said bundle of filaments being contained within an exterior sheath which device comprises:

an elongated, injection nozzle adapted to extend from the exterior of said cable at least part way into said bundle of filaments for injecting fluid directly into the interior of said bundle of filaments;

at least one lateral opening being provided in the walls of said nozzle, said opening being adapted to discharge fluid directly into the cross-sectional voids in said bundle of filaments; and an internal longitudinal opening extending longitudinally in said nozzle and communicating with said lateral opening; and a pliable generally sheet-shaped flap in operative association with said nozzle adapted to prevent the substantial leakage of fluids from the interior to the exterior of said cable and adapted to secure said nozzle in the interior of said cable said flap having a hole therethrough, the longitudinal axis of said nozzle being generally perpendicular to the plane of said flap and extending through said hole, the side of said flap which is adjacent to said nozzle being adapted to be secured in a substantially fluid-tight relationship to the exterior surface of said cable.

3. The device of claim 2 wherein said nozzle is adapted to extend at least half way through the diameter of said cable.

4. A device for injecting fluids into the interior of a sheathed cable which comprises:

a flexible sheet-shaped flap, a fitting adapted to be positioned against one side of said flap, and an elongated injection nozzle adapted to be affixed to the other side of said flap, said nozzle having at least one distribution opening in the walls thereof and an internal longitudinal opening extending longitudinally in said nozzle and communicating with said distribution opening, said flap having a hole therethrough, said nozzle being adapted to be affixed to said flap so that said fitting; said hole and said longitudinal opening cooperate to permit the passage of fluid through said fitting and said hole into said longitudinal opening.

5. A device for injecting fluids into the interior of a sheathed cable which comprises:

a flexible sheet-shaped flap;

an elongated injection nozzle adapted to be positioned against one side of said flap and extending generally perpendicular from said flap;

a fitting adapted to be positioned against the other side of said flap; and a hole in said flap, said fitting and said nozzle being adapted to cooperate with each other through said hole to affix said nozzle and said fitting to the opposite sides of said flap.

6. The device of claim 5 wherein the exterior walls of said injection nozzle taper longitudinally in said nozzle to provide a decreasing nozzle cross-sectional area from said flap.

7. The device of claim 5 wherein said flap is at least partially coated with a pressure-sensitive adhesive on the side of said flap to which said nozzle is adapted to be affixed.

8. A device for injecting fluids into the interior of a sheathed cable which comprises:

a flexible, generally rectangular, sheet-shaped flap having a first side and a second side;

an elongated generally cylindrical fitting having one end affixed to said first side of said flap and extending generally perpendicular from said first side, the other end of said fitting being adapted to be affixed to a source of fluid;

an opening extending longitudinally through the interior of said fitting and passing through said flap;

an elongated longitudinally tapered injection nozzle extending from said second side of said flap, said nozzle having a stem portion at the larger end thereof adapted to fit into said opening in said fitting and a shoulder portion adapted to abut said second side of said flap;

a keyway in the portion of said opening into which said stem fits and a key on said stem portion of said nozzle adapted to fit into said keyway;

a longitudinal opening in the interior of said nozzle adapted to communicate with said opening in said fitting; and lateral openings in the walls of said nozzle communicating with said longitudinal opening in said nozzle, said key and said keyway being adapted to cooperate to position said lateral openings so that they open in a predetermined direction.

References Cited by the Examiner
UNITED STATES PATENTS

| | | | |
|---|---|---|---|
| 1,774,292 | 8/1930 | Reed | 174—23 |
| 2,792,441 | 5/1957 | Platow | 174—23 |
| 2,967,795 | 1/1961 | Bollmeier et al. | 174—84 |
| 3,215,761 | 11/1965 | Gelpey | 174—76 |

EARL M. BERGERT, *Primary Examiner.*

T. R. SAVOIE, *Assistant Examiner.*